(12) United States Patent
Tano et al.

(10) Patent No.: US 10,095,899 B2
(45) Date of Patent: Oct. 9, 2018

(54) METHOD AND SYSTEM FOR READING INFORMATION CODES

(71) Applicant: DENSO WAVE INCORPORATED, Chita-gun, Aichi-pref. (JP)

(72) Inventors: Atsushi Tano, Kariya (JP); Takao Ushijima, Toyoake (JP)

(73) Assignee: DENSO WAVE INCORPORATED, Aichi-Pref. (JP)

( * ) Notice: Subject to any disclaimer, the term of this patent is extended or adjusted under 35 U.S.C. 154(b) by 0 days.

(21) Appl. No.: 15/064,248

(22) Filed: Mar. 8, 2016

(65) Prior Publication Data

US 2016/0267303 A1   Sep. 15, 2016

(30) Foreign Application Priority Data

Mar. 9, 2015   (JP) ................................ 2015-045601

(51) Int. Cl.
| | |
|---|---|
| *G06K 7/10* | (2006.01) |
| *G06Q 10/08* | (2012.01) |
| *G06Q 30/00* | (2012.01) |
| *G06K 7/14* | (2006.01) |

(52) U.S. Cl.
CPC ....... *G06K 7/10722* (2013.01); *G06K 7/1417* (2013.01); *G06Q 10/087* (2013.01); *G06Q 30/018* (2013.01)

(58) Field of Classification Search
USPC .................................................... 235/462.11
See application file for complete search history.

(56) References Cited

U.S. PATENT DOCUMENTS

| | | | | |
|---|---|---|---|---|
| 6,199,048 | B1 * | 3/2001 | Hudetz | ............. G06F 17/30879 235/462.01 |
| 2003/0198383 | A1 | 10/2003 | Yamaguchi et al. | |
| 2009/0323959 | A1 * | 12/2009 | Hara | ........................ G09C 5/00 380/277 |
| 2012/0118947 | A1 * | 5/2012 | Lyons | ................. G07F 17/3241 235/375 |
| 2014/0112551 | A1 * | 4/2014 | Terwilliger | .............. G06K 9/00 382/118 |

\* cited by examiner

*Primary Examiner* — Michael G Lee
*Assistant Examiner* — David Tardif
(74) *Attorney, Agent, or Firm* — Oliff PLC (57) ABSTRACT

An information code reading system includes an information code terminal and a server communicably connected to the terminal. In the terminal, an information code with first and second information is imaged, and transmitted to the server information indicating the information code. The server decodes the information indicating the information code received from the terminal, and memorize information showing that the information code has become an object being read, when the second information is provided via the decoding process. From the server, either the first information or information related to the first information provided via the decoding process is transmitted to the terminal. Hence, in the terminal, a process is performed with the first information received from the server.

22 Claims, 7 Drawing Sheets

METHOD AND SYSTEM FOR READING INFORMATION CODES

CROSS-REFERENCE TO RELATED APPLICATION

This application is based on and claims the benefit of priority from earlier Japanese Patent Application No. 2015-45601 filed Mar. 9, 2015, the description of which is incorporated herein by reference.

BACKGROUND

Technical Field of the Invention

The present invention relates to a method and system for reading information codes, and particularly, to the method and system uses a server communicably connected to information processing terminals.

Related Art

There are widespread systems for facilitating access to websites desired by users. To make such access, an information code in which a uniform resource locator (URL) is stored is read by an information processing terminal, such as a cell-phone or a smartphone, to make use of the URL after being decoded. The effects of the guidance to websites making use of such information codes can be investigated by having the information processing terminals accessed a compilation server prior to making access to the websites and by acquiring the logs or the like.

There is a known technique related to such a system for making use of information codes and acquiring the logs or the like when websites are accessed. For example, U.S. Pat. No. 6,199,048 discloses an information management system as such a technique. The information management system disclosed in this patent document includes a server which is provided with a database. In the database, pieces of information read from barcodes (indexes) are correlated to URSs. On the other hand, a user can use a barcode reader to read information from a barcode and transmit the information to the server through Internet network, for example, to thereby receive a URL correlated to the barcode from the server.

When an information code in which a URL is stored is read by means of a cell-phone, a smartphone or the like, a URL obtained by reading the information code is displayed prior to the user's access to the desired website. The user can select the displayed URL for the allowance of access, so that a processing for making access to the desired website is performed. As mentioned above, in the system for acquiring logs or the like at the time of users' accesses to their desired websites via the use of information codes, or the system for comprehending the usage status, the users are supposed to make access to the desired websites by way of a server. In this system, therefore, the URL for making access to the server is displayed first.

Accordingly, a URL not related to the desired website is displayed rather than the URL of the desired website. In this case, some user may determine the information code to be fraudulent, and may feel a sense of distrust from the information code the user has read. Further, the firm that desires to guide access to its own website via the use of the information code does not desire displaying the URL not related to the firm.

SUMMARY

Hence it is desired to provide an information code reading system with which usage status of an information code can be easily comprehended without giving a sense of distrust to the users.

In order to achieve the above object, a first aspect of the present disclosure is a system which reads an information code, comprising: an information processing terminal; and a server communicably connected to the information processing terminal. The information processing terminal is provided with imaging means for imaging an information code in which first and second information is recorded, terminal-side transmitting means for transmitting, to the server, information indicating the information code obtained by the imaging means, and information processing means for performing a process with the first information received from the server in reply to transmission of the information indicating the information code from the terminal-side transmitting means. The server is provided with decoding means for decoding the information indicating the information code received from the information processing terminal, storage means for memorizing therein information showing that the information code has become an object being read, when the second information is provided via decoding of the decoding means, and server-side transmitting means for transmitting, to the information processing terminal, either the first information or information related to the first information provided via decoding of the decoding means.

It should be noted that the bracketed numerals indicate correlation to the specific means in the embodiments described later.

According to the first aspect of the present disclosure, the information processing terminal captures an image of an information code using the imaging means to obtain information (e.g. image data of the information code) necessary for decoding the information code. The information is transmitted to the server by the terminal-side transmitting means. In the server, on the other hand, the decoding means decodes the information code received from the information processing terminal, i.e. decodes the image of the information code captured by the imaging means. When the second information is decoded, the storing means stores information indicating that the information code in which the second information is recorded has been read. Then, the first information or information associated with the first information obtained by the decoding means is transmitted to the information processing terminal by the server-side transmitting means. Then, based on the information received from the server in response to the transmission, the information processing means carries out a processing.

With this configuration, since the storing means of the server stores information indicating that the information code in which the second information is recorded has been read, one can easily comprehend usage status (utilization frequency, utilization hours, etc.) of the information code on the basis of the information stored in the storing means. On the other hand, the information processing terminal no longer needs to have a decoding function. Also, when the user enjoys services associated with the first information based on the information received from the server, the URL or the like for accessing the server will not be displayed. Therefore, the usage status of the information code can be easily comprehended without giving a sense of distrust to the user.

The above advantageous effects are true of the method for reading information codes provided in the present disclosure.

In a second aspect of the present disclosure, the information code is a partially non-disclosed code that includes a non-disclosed region and a disclosed region, the first information being recorded in the disclosed region, the second information being recorded in the non-disclosed code and encrypted according to an encryption key, and the storage means is configured to memorize the encryption key such that the decoding means decode the second information based on the encryption key.

With this configuration, commonly used reading devices that do not possess the encryption key are able to read the first information from the information code but are not able to read the second information. This can keep the secrecy about the configuration for using the code-issue number to comprehend the usage status of the information code. In particular, since the commonly used reading devices can read the first information from the information code, the services provided by using the first information are prevented from being exclusively available for the information processing terminals.

In a third aspect of the present disclosure, the information code has an array of a plurality of types of cells which are different, at least, in colors, densities or luminances from each other, and the information indicating the information code includes information necessary for decoding the information code, the information necessary for decoding the information code being information showing digitization of the cells according to the colors, densities or luminances.

With this configuration, the information processing terminal is ensured to transmit digitized cell information (e.g., binarized cell information) to the server. The digitized cell information has a much smaller volume compared to image data of the information code, and hence contributes to reducing the processing load and time involved in transmitting the data to the server. In particular, since a third party cannot obtain the results of decoding from the digitized cell information, security of the information code can be ensured.

In a fourth aspect of the present disclosure, the server comprises determination means for determining, based on decoding performed by the decoding means, whether or not the information code is an authentic information code imaged by the imaging means, and the server-side transmitting means is configured to transmit, to the information processing terminal, information indicting determination of the determination means.

The determining means makes use of the results of comparing the first or second information or a combination of the first and second information, with the given information stored in advance in the database. Thus, the determining means is able to easily determine whether or not the image of the information code captured by the imaging means is an authentic information code. Accordingly, the server transmits information associated with the results of the determination made by the determining means to the information processing terminal. Thus, the information processing terminal is able to easily acquire information for determining whether or not the read information code or the article or the like to which the information code has been attached is an authentic one.

In a fifth aspect of the present disclosure, the server is configured to manage information linked to the second information, the information linked to the second information being among results of decoding of the decoding means, and the server-side transmitting means is configured to transmit, to the information processing terminal, the information linked to the second information in reply to the decoding of the decoding means.

With this configuration, in the case where data linked to the second information is transmitted, instead of the first information or information associated with the first data, to the information processing terminal, the user can enjoy services making use of the information linked to the second information.

DETAILED DESCRIPTION OF THE PREFERRED EMBODIMENTS

With reference to the accompanying drawings, hereinafter are described some embodiments of the present invention.

First Embodiment

Figure 1:
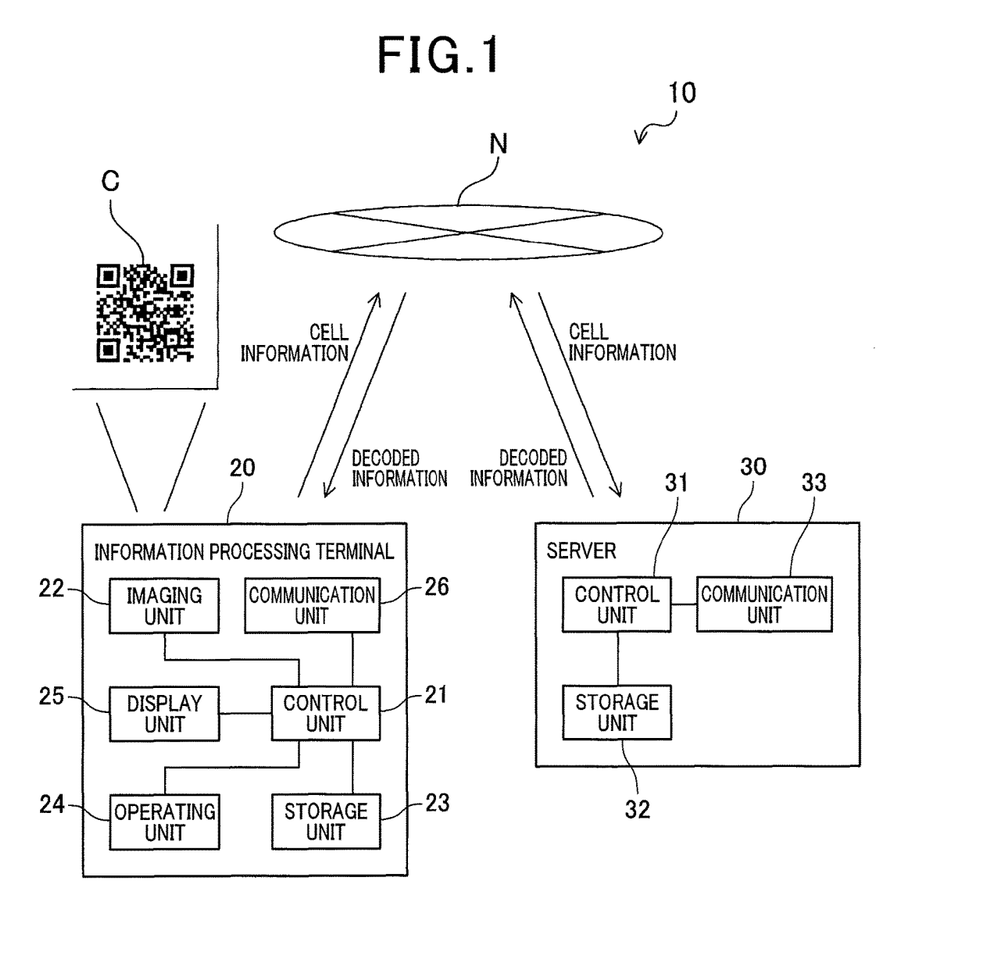
FIG. 1 is a schematic diagram illustrating a configuration of an information code reading system, according to a first embodiment of the present invention.

The following description sets forth a first embodiment in which an information code reading system of the present invention is realized. FIG. 1 is a schematic diagram illustrating a configuration of an information code reading system 10, according to the first embodiment. For the sake of convenience, FIG. 1 shows only one of a plurality of information processing terminals 20.

The information code reading system 10 of the present embodiment is used for investigating the usage status or the like of an information code in association with the services utilizing the information code. The investigation is conducted by acquiring predetermined information, which corresponds to an image of the information code, from the information processing terminals 20. As shown in FIG. 1, the information code reading system 10 includes one or more information processing terminals 20, and a server 30. The server 30 is able to decode the image of the information code captured by the information processing terminal 20. The information processing terminal 20 is connected to the server 30 via a network N, such as internet, so as to be able to communicate with each other.

First, an information code C used by the information code reading system 10 will be described.

The information code C is attached to an object issued and distributed by an administrative party that manages and operates the server 30. The information code C is configured by arraying a plurality of types of cells having different colors, densities or luminances. Specifically, the information code C used in the present embodiment is a QR code (registered trademark) where two types of cells, or light color cells and dark color cells, are arrayed. The QR code (registered trademark) includes codewords configured according to the arrays of a predetermined number of light color cells and dark color cells. The codewords include information codewords which are made up of several codewords for encrypting data as an object to be decoded, and an error correction codeword which corrects errors. The QR code is configured to include these codewords together with a position detection pattern or the like. In other words, the QR code is provided with an error correction region for correcting errors.

In particular, in the present embodiment, the information code C is configured as a partially non-disclosed code that includes a non-disclosed region and a disclosed region. The non-disclosed region is a region where data encrypted based on a predetermined encryption key is recorded. The disclosed region is a region where data to be disclosed, not encrypted by the encryption key, is recorded. The information code C is ensured to be decoded only when there is an encryption key or a decoding key corresponding to the encryption key (hereinafter simply referred to as an encryption key). The disclosed region in the partially non-disclosed code is configured to be a region where data is readable by a commonly used reading device without having an encryption key.

The technique disclosed in JP-A-2009-009547 or JP-A-2008-299422, for example, can be favorably applied to the method for producing such a partially non-disclosed code or to the specific configuration of the partially non-disclosed code. Basically, the method for reading the partially non-disclosed code that has been produced using the technique disclosed in JP-A-2009-009547 or JP-A-2008-299422 is similar to the one disclosed therein. Specifically, first, the data is read from the header to the terminator using a method similar to the one used for a QR code (registered trademark) which has been known. After that, it is determined whether or not there is a secret identifier at a predetermined position. If there is a secret identifier, the data in the non-disclosed region that follows the secret identifier is supposed to be read.

As mentioned above, the data in the non-disclosed region is encrypted by an encryption key and thus can be read only when the encryption key is available. It should be noted that this example should not impose a limitation to the methods for producing partially non-disclosed codes, or to the configurations of partially non-disclosed codes. Any method other than those described in the above patent documents may be used as long as the method is able to produce an information code having a non-disclosed region where encrypted information is recorded and a disclosed region where disclosed information is recorded.

The present embodiment uses a code-issue number as the encrypted information recorded in the non-disclosed region. The code-issue number is used for investigating usage status or the like of an information code, in association with providing services using the information code. Specifically, a commonly used reading device that does not possess an encryption key is only able to optically read disclosed information recorded in the disclosed region, but is not able read the code-issue number (encrypted information) recorded in the non-disclosed region. It should be noted that the disclosed information can correspond to an example of the first information, while the code-issue number (encrypted information) can correspond to an example of the second information.

The following description sets forth a configuration of the information processing terminal 20.

The information processing terminal 20 is configured by installing a given application program distributed by the above administrative party or the like into a mobile terminal, such as a smartphone, having a camera function. The information processing terminal 20 includes an imaging unit 22 serving as the imaging means, and a control unit 21 processing image data which is based on a pixel signal derived from the imaging unit 22. The information processing terminal 20 also includes a storage unit 23, an operating unit 24, a display unit 25 and a communication unit 26.

The control unit 21 is mainly configured by a microcomputer including a CPU, a system bus, an input/output interface, and the like to serve as an information processor together with the storage unit 23. The storage unit 23 is configured such as by a ROM, a RAM, and a known semiconductor memory, such as a nonvolatile memory. The storage unit 23 stores in advance a given program or the like for reading an information code, so that the control unit 21 can execute the program.

The operating unit 24 is configured such as by a plurality of keys to input information into the control unit 21 in response to a key operation. The display unit 25 is configured such as by liquid crystal. The display unit 25 is controlled by the control unit 21 to display and notify information obtained by capturing an image of an information code. The communicating section 26 is controlled by the control unit 21 to perform radio communication with the server 30, for example, via the network N.

Next, a configuration of the server 30 will be described.

The server 30 is configured as a computer having a function of a decode server. Specifically, the server 30 receives information from the information processing terminal 20. The information is an image of an information code captured by the information processing terminal 20. On the basis of the received image, the server 30 decodes the information code. The server 30 includes a storage unit 32 and a communication unit 33, and a control unit 31 controlling overall the storage unit 32 and the communication unit 33. The control unit 31 is mainly configured by a microcomputer including a CPU, a system bus, an input/output interface and the like to serve as an information processor together with the storage unit 32.

The storage unit 32 is configured by a ROM, a RAM, a known semiconductor memory, such as a nonvolatile memory. The storage unit 32 stores in advance an application program for executing decoding on the basis of the information received from the information processing terminal 20, a given database, and the like, so that the control unit 31 can use them. The storage unit 32 stores the encryption key mentioned above so that the encrypted information (code-issue number) recorded in the non-disclosed region of a partially non-disclosed code can be decoded. The communication unit 33, being controlled by the control unit 31, communicates with the information processing terminal 20 and other external devices via the network N.

In particular, in the present embodiment, the storage unit 32 includes the database which is formulated to investigate usage status of the distributed information code C. In the database, several code-issue numbers are registered in advance. As will be described later, the database is configured to store the time of reception of a code-issue number every time it is received from the information processing terminal 20. Specifically, the database is ensured to store information (logs) for investigating the number of times of use or the time of use of the code-issue number registered in advance. It should be noted that the storage unit 32 can correspond to an example of the storing means.

Figure 2:
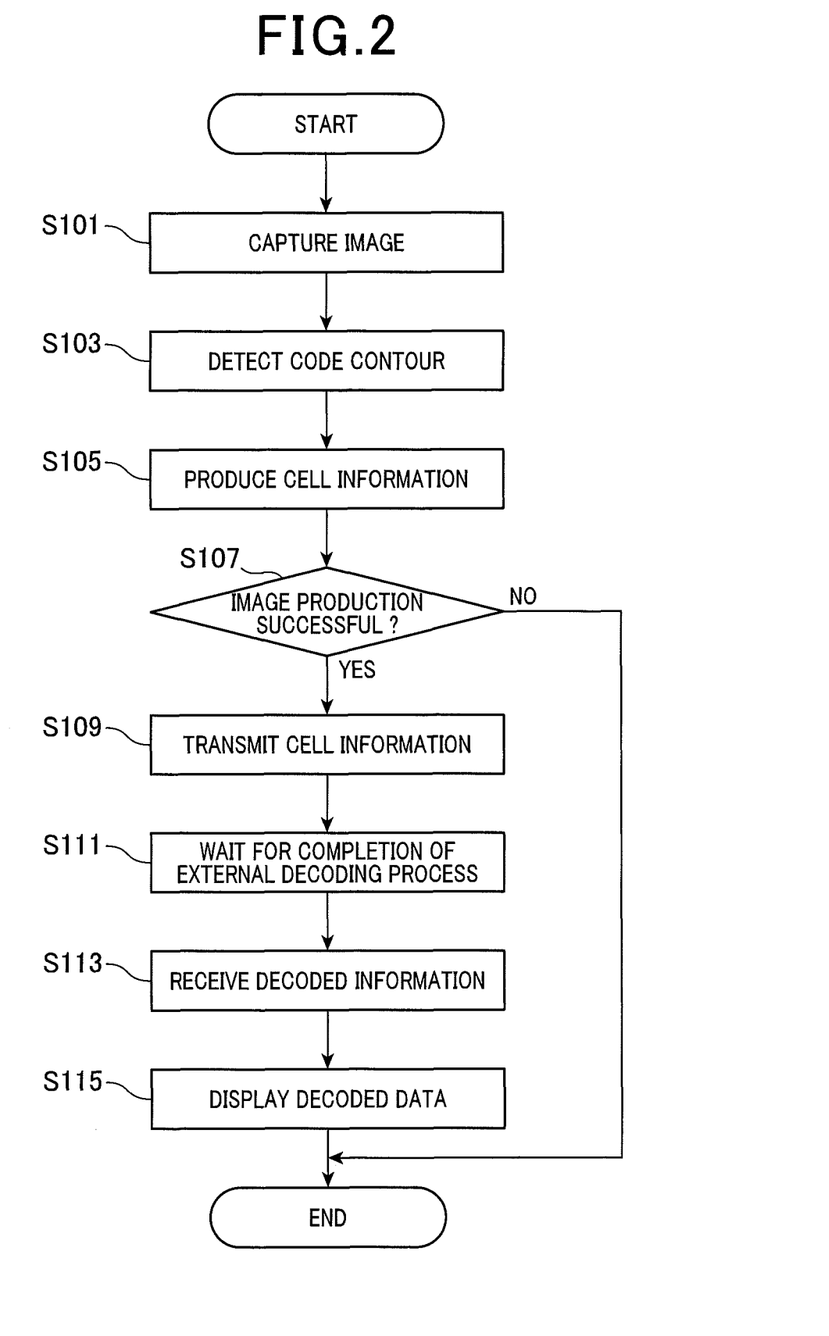
FIG. 2 is a flow diagram illustrating a flow of a reading process performed by a control unit of an information processing terminal, according to the first embodiment.
Figure 3:
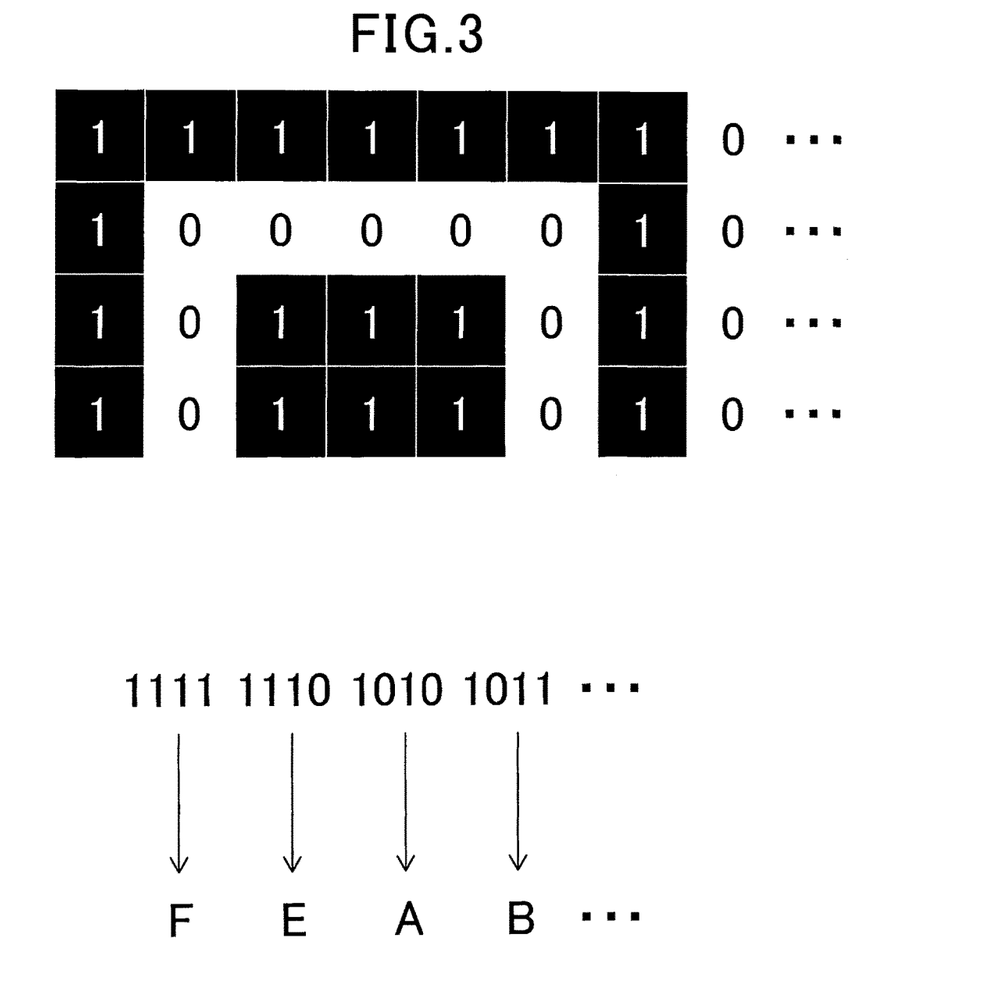
FIG. 3 is a diagram illustrating cell information generated from a code image, according to the first embodiment.
Figure 4:
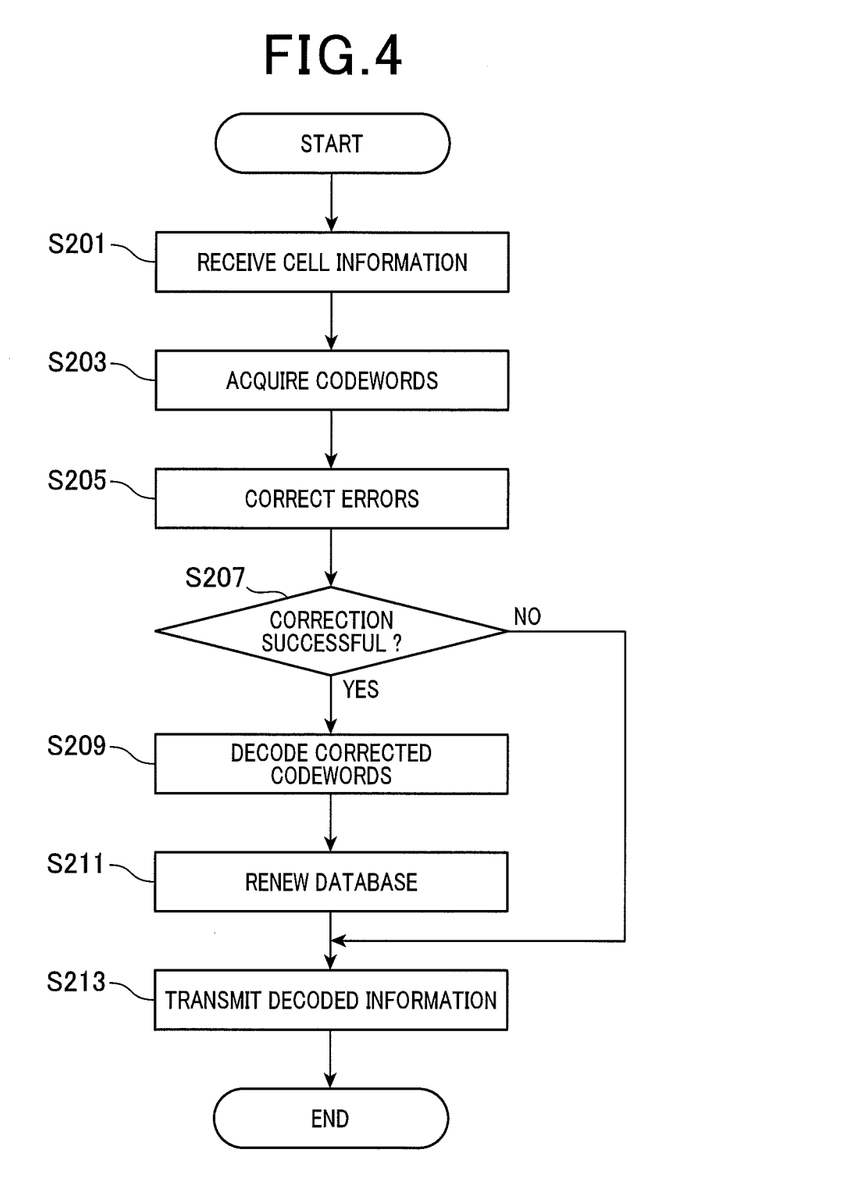
FIG. 4 is a flow diagram illustrating a flow of an external decoding process performed by a control unit of a server, according to the first embodiment.

Referring now to FIGS. 2 to 4, hereinafter will be described a process of investigating usage status of an information code performed in the information code reading system 10 configured as described above. The following description is provided by way of an example of a partially non-disclosed code used as the information code C. In this partially non-disclosed code, the code-issue number is recorded in the non-disclosed region, and a URL of a website used when enjoying the services (hereinafter also revered to as a target URL) is recorded in the disclosed region. FIG. 3 shows part of a position detection pattern and the vicinity thereof in a QR code (registered trademark). Specifically, FIG. 3 shows a relationship between an array of light color cells and an array of dark color cells.

Referring first to FIG. 2, a reading process performed by the control unit 21 of the information processing terminal 20 will be described in detail. FIG. 2 shows a flow diagram of the reading process.

A user possessing the information processing terminal 20 performs a predetermined key operation using the operating unit 24 so that the control unit 21 starts the reading process. Then, an imaging operation is performed in a state where the camera of the imaging unit 22 being oriented to the information code C. In response to the imaging operation, imaging processing is performed at step S101 of FIG. 2 by having the imaging unit 22 captured an image of the information code C.

Then, at step S103, a code contour detection processing is performed. If the image captured in the imaging processing includes an information code, the contour of the information code occupying the captured image is detected. Then, at step S105, a cell information producing processing is performed. As shown in FIG. 3, cells configuring the extracted code image are divided into a light level and a dark level (binarized) on the basis of a predetermined threshold to produce data according to an arrayed state of the light color cells and the dark color cells (hereinafter also referred to as cell information).

After the cell information has been successfully produced (Yes at step S107), control proceeds to step S109 to perform a cell information transmission processing. Specifically, at step S109, the cell information produced as mentioned above is transmitted to the server 30 by the communication unit 26 via the network N. If the image of the information code C has not been appropriately captured and production of the cell information is unsuccessful (No at step S107), the present reading process is terminated without performing the processings on or after step S109. It should be noted that the control unit 21 and the communication unit 26 performing the processing of step S109 can correspond to an example of the processing as the terminal-side transmitting means.

Then, in reply to the transmission of the cell information, completion of an external decoding process (i.e., a decoding process performed outside the information processing terminal) is waited for (step S111). If the external decoding process is successful, a target URL is received as decoded information from the server 30 (step S113), as will be described later, followed by a displaying processing performed at step S115. In the displaying processing, the target URL received from the server 30 is displayed on the display unit 25 as a result of decoding the imaged information code. Then, the user can select the target URL displayed on the display unit 25 by tapping or the like. Thus, when the access using the target URL is allowed, an access processing for the website corresponding to the target URL is started. In this way, an image of the information code C is captured by the user by means of the information processing terminal 20 to bring the target URL recorded in the information code C into a usable state.

On the other hand, if the external decoding process is unsuccessful and thus a decoding failure notification is received from the server 30 (step S113) as will be described later, the fact of the unsuccessful decoding is displayed on the display unit 25 together with the reasons for the failure (step S115). It should be noted that the processing at step S115 can correspond to an example of the processing as the information processing means.

Referring to FIG. 4, an external decoding process (i.e., a decoding process performed outside the information processing terminal) performed by the control unit 31 of the server 30 will be described. FIG. 4 shows a flow diagram of the external decoding process.

With the start of the external decoding process by the control unit 31 of the server 30, the cell information from the information processing terminal 20 is received and acquired by the communication unit 33 via the network N (step S201 of FIG. 4). Then, at step S203, a codeword acquiring processing is performed. In this processing, a codeword string is acquired on the basis of the arrayed state of the light color cells and the dark color cells derived from the received cell information.

Then, control proceeds to step S205 where an error correction processing is performed. In the error correction processing, a known error correction is performed for the acquired codeword. If the error correction is successfully performed (Yes at step S207), control proceeds to step S209 to perform a decoding processing. In the decoding processing, the codeword string whose error has been corrected is decoded into information or data according to a prescribed rule. As a result of the decoding, there are acquired the target URL recorded in the disclosed region and the code-issue number recorded in the non-disclosed region. It should be noted that the processing performed at step S209 can correspond to an example of the processing as the decoding means.

Following the acquisition of the target URL and the code-issue number, control proceeds to step S211 where a database renewal processing is performed. In this processing, in association with the code-issue number acquired by decoding, the database of the storage unit 32 is renewed by adding information or data concerning the time of reception of the cell information (hereinafter also referred to as reception time information). The reception time information indicates that the information code C recording the code-issue number has been read. Specifically, every time an image of the information code C recorded with the code-issue number is captured and transmitted to the server 30, the database of the storage unit 32 is ensured to sequentially store the reception time information.

In this way, the reception time information is sequentially stored in the database of the storage unit 32. Accordingly, based on the information stored in the database, a user or a processor can comprehend not only the usage hours of the information code C, but also the usage status of the information code C, including the utilization frequency, on the basis of the number of times of storing.

When the reception time information is stored in the database of the storage unit 32 as described above, control proceeds to step S213 where a decoded information transmission processing is performed. In this processing, the target URL recorded in the disclosed region of the information acquired as described above is transmitted as decoded information to the information processing terminal 20 by the communication unit 33 via the network N. In this case, the code-issue number recorded in the non-disclosed region is not transmitted to the information processing terminal 20. On the other hand, if the error correction at step S205 is unsuccessful (No at step S207), the fact of unsuccessful decoding and the reasons for the failure are transmitted, as a decoding failure notification, to the information processing terminal 20 by the communication unit 33 via the network N (step S213). The control unit and the communication unit 33 performing the processing of step S213 can correspond to an example of the processing as the server-side transmitting means.

As described above, in the information code reading system 10 of the present embodiment, an image of the information code C is captured by the imaging unit 22. The obtained cell information is transmitted to the server 30 by the communication unit 26 via the network N. In response to the transmission, the server 30 carries out processing on the basis of the received information. In the server 30, the image of the information code C captured by the imaging unit 22 is decoded on the basis of the cell information received from the information processing terminal 20. Then, when the code-issue number (corresponding to the second information) is decoded, the reception time information is stored in the database of the storage unit 32. After that, the target URL (corresponding to the first information) obtained by the decoding processing is transmitted to the information processing terminal 20 by the communication unit 33 via the network N.

Thus, reception time information is sequentially added and stored in the database of the server 30. Accordingly, a user or a processor can easily comprehend the usage status of the information code C (e.g., utilization frequency, utilization hours, etc.) on the basis of the information stored in the database. On the other hand, the information processing terminal 20 does not have to decode the information code C. Further, a URL, for example, for accessing the server 30 is not displayed when enjoying the services available from the target URL, according to the information received from the server 30. Therefore, the usage status of the information code C can be easily comprehended without giving a sense of distrust to the user.

The information code C is a partially non-disclosed code that includes a disclosed region where the target URL (the first information) is recorded and a non-disclosed region where the code-issue number encrypted based on an encryption key (the second information) is recorded. In the storage unit 32, the encryption key is stored so that the code-issue number can be decoded by performing the decoding processing (step S209).

Thus, a commonly used reading device which does not possess an encryption key is able to read the target URL from the information code C, but is not able to read the code-issue number. This can keep the secrecy about the configuration for using the code-issue number to comprehend the usage status of the information code. In particular, since a commonly used reading device can read the target URL from the information code C, the services provided by using the target URL are prevented from being exclusively available for the information processing terminal 20 of the present invention.

In particular, the cell information transmitted from the information processing terminal 20 is configured as digitized data. The digitization is based on light and dark (colors, densities or luminances) of the cells of the information code C included in the image captured by the imaging unit 22.

Thus, the information processing terminal 20 is ensured to transmit digitized cell information (e.g., binarized cell information) to the server 30. Such digitized cell information has a much smaller volume compared to image data of the information code, which contributes to reducing the processing load and time involved in transmitting information or data to the server 30. In particular, since a third party cannot obtain the results of decoding from the digitized cell information, security of the information code C can be ensured.

Second Embodiment

Figure 5:
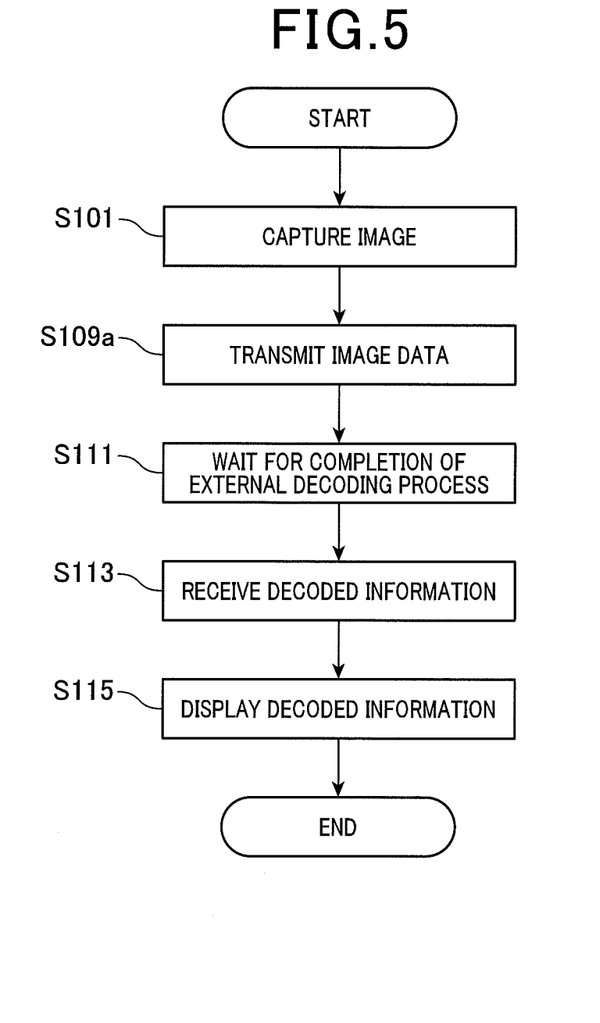
FIG. 5 is a flow diagram illustrating a flow of a reading process performed by a control unit of an information processing terminal, according to a second embodiment of the present invention.
Figure 6:
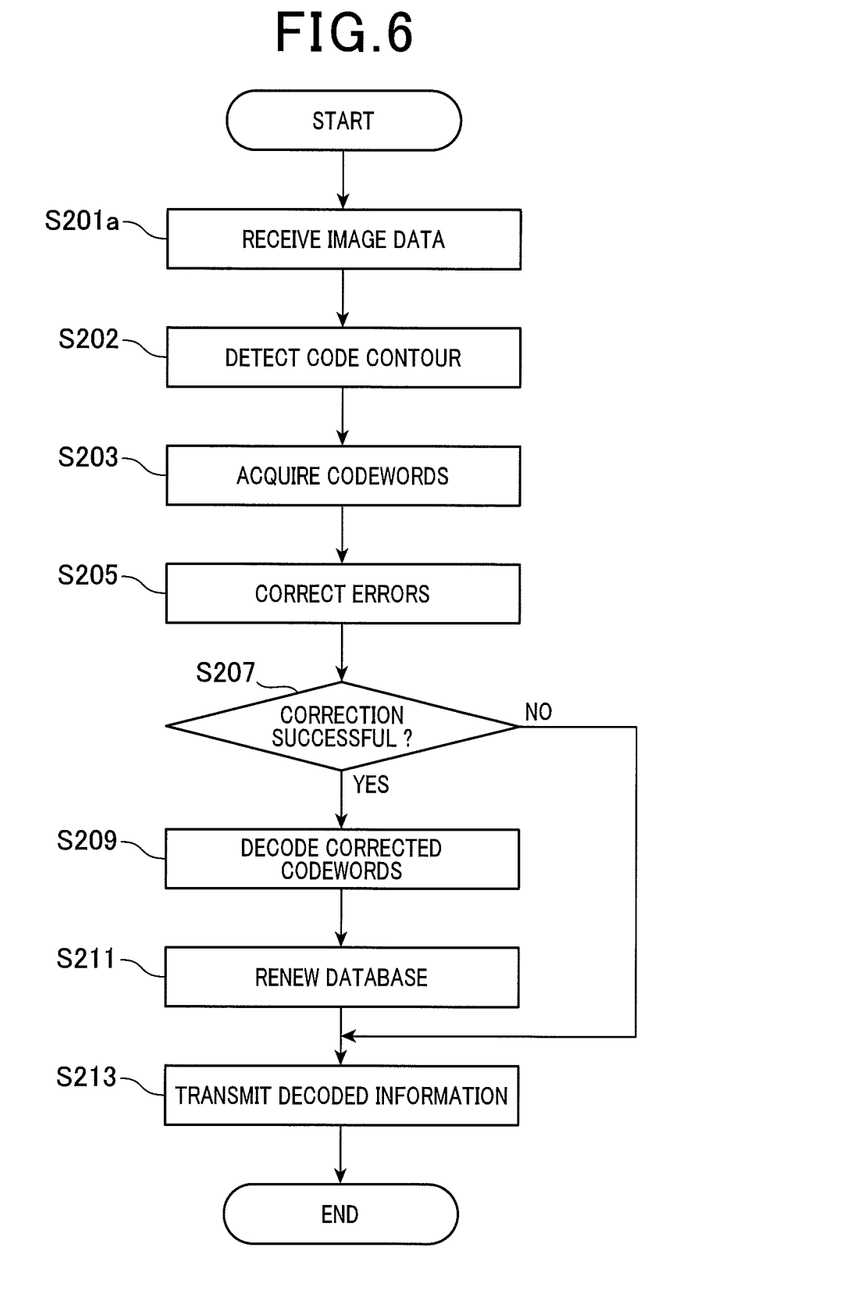
FIG. 6 is a flow diagram illustrating a flow of an external decoding process performed by a control unit of a server, according to a second embodiment.

Referring now to FIGS. 5 and 6, an information code reading system according to a second embodiment of the present invention will be described.

The second embodiment is chiefly different from the first embodiment in that the information processing terminal 20 transmits an information code to the server 30 in the form of image data. Therefore, the components identical with or similar to those in the first embodiment are given the same reference numerals for the sake of omitting unnecessary explanation.

The description below sets forth a process for investigating usage status of an information code in the information code reading system 10 according to the present embodiment. FIGS. 5 and 6 are flow diagrams associated with the process.

First, referring to the flow diagram of FIG. 5, a reading process performed by the control unit 21 of the information processing terminal 20 will be described.

Similar to the first embodiment, an image of the information code C is captured by the imaging unit 22 (step S101 of FIG. 5). Then, control proceeds to step S109a where an image data transmission processing is performed. Specifically, at step S109a, the image data showing an image of the information code C is transmitted to the server 30 by the communication unit 26 via the network N. It should be noted that the control unit 21 and the communication unit 26 performing the processing at step S109a can correspond to an example of the processing as the terminal-side transmitting means.

Then, in reply to the transmission of the cell information (i.e., image data), completion of the external decoding process is waited for (step S111). If the external decoding process is successful, the target URL as decoded information is received from the server 30 (step S113) and displayed on the display unit 25 (step S115). Then, when the target URL displayed on the display unit 25 is selected by the user and access is allowed, a process of accessing the website corresponding to the target URL is started.

Referring to FIG. 6, the external decoding process performed by the control unit 31 of the server 30 will be described in detail.

Upon start of the external decoding process by the control unit 31 of the server 30, the image data is received and acquired from the information processing terminal 20 by the communication unit 33 via the network N (step S201a of FIG. 6). Then, similar to step S103 of the first embodiment, a code contour detection processing is performed to detect or extract the contour of the information code C occupying in the imaged data (step S202). Subsequently, those cells which configure the extracted code image are divided into either a light color level or a dark color level (i.e., binarized levels) on the basis of a predetermined threshold to acquire codeword strings on the basis of the arrayed state of the light color cells and the dark color cells (step S203).

Then, control proceeds to step S205 where the error correction processing is performed to correct errors of the acquired codeword strings using a known method. If the error correction is successfully performed (Yes at step S207), the corrected codeword strings are decoded into data according to a prescribed rule to acquire both the target URL recorded in the disclosed region and the code-issue number recorded in the non-disclosed region (step S209).

After acquiring the target URL and the code-issue number in this way, the database of the storage unit 32 is renewed by adding the reception time information in association with the code-issue number acquired by decoding (step S211). Then, of the information acquired as described above, the target URL recorded in the disclosed region is transmitted as decoded information by the communication unit 33 to the information processing terminal 20 via the network N (step S213).

As described above, the information processing terminal 20 is configured to transmit image data, which shows an image of the information code C, to the server 30. In this configuration as well, the reception time information is additionally and sequentially stored in the database of the server 30. Thus, usage status (utilization frequency, utilization hours, etc.) of the information code C can be easily comprehended on the basis of the information stored in the database. On the other hand, the information processing terminal 20 does not have to decode the information code C. Further, a URL, for example, for accessing the server 30 is not displayed when enjoying the services available from the target URL, according to the information received from the server 30. Therefore, the usage status of the information code C can be easily comprehended without giving a sense of distrust to the user. Therefore, the usage status of the information code C can be easily comprehended without giving a sense of distrust to the user.

Third Embodiment

Figure 7:
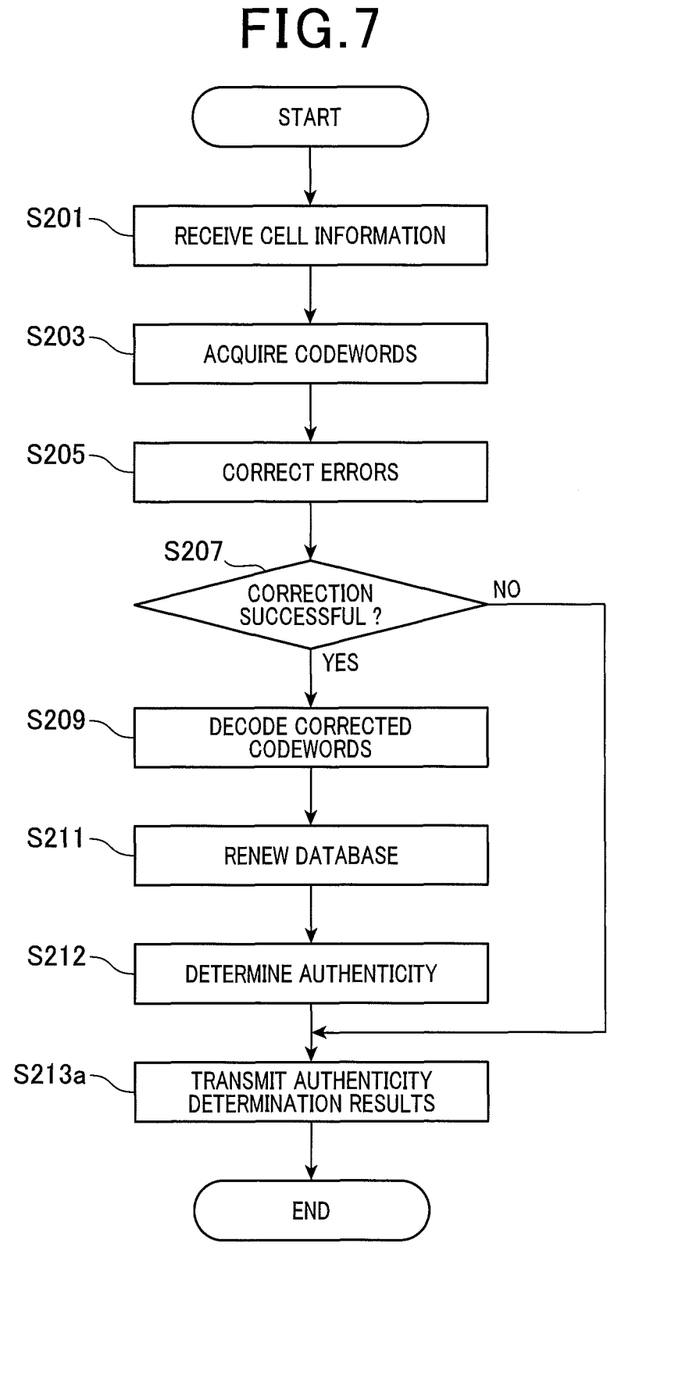
FIG. 7 is a flow diagram illustrating a flow of an external decoding process performed by a control unit of a server, according to a third embodiment of the present invention.

Referring to FIG. 7, an information code reading system according to a third embodiment of the present invention will be described.

The third embodiment is chiefly different from the first embodiment in that information associated with the disclosed information recorded in the disclosed region of the information code C is transmitted from the server 30 to the information processing terminal 20. Therefore, the components identical with or similar to those in the first embodiment are given the same reference numerals for the sake of omitting unnecessary explanation.

Specifically, for example, in the information code reading system 10 of the present embodiment, the disclosed information and the code-issue number (the non-disclosed information) are acquired through the external decoding process performed in the server 30. Upon acquisition of the information, it is determined whether or not the information code imaged by the information processing terminal is an authentic information code. The results of the determination are transmitted to the information processing terminal 20. In other words, the server 30 of the present embodiment serves as an authenticity determination server that determines whether or not the information code imaged by the information processing terminal 20 is an authentic information code.

In the present embodiment, the information code C configured as an authentic information code is provided as a partially non-disclosed code in which the disclosed information and the code-issue number satisfy a predetermined relationship. Thus, the disclosed information and the code-issue number acquired through the decoding process are compared with predetermined information. The predetermined information in this case is stored in advance in the database of the storage unit 32 according to the predetermined relationship mentioned above. As a result of the comparison, if the disclosed information and the code-issue number acquired through the decoding process satisfy the predetermined relationship, the information code is determined to be authentic, and if not, determined not to be authentic. The disclosed information related to the present embodiment serves as data for determining authenticity, and hence may simply be a serial number, or may be data, such as the target URL, that can also provide other function.

The following description specifically sets forth an external decoding process for authenticity determination performed by the control unit 31 of the server 30 in the present embodiment. FIG. 7 is a flow diagram showing the external decoding process.

Similar to the first embodiment, the cell information is received and acquired by the communication unit 33 from the information processing terminal 20 via the network N (step S201 of FIG. 7). Then, codeword strings are obtained from the received cell information (step S203). If the known error correction is successful for the acquired codeword strings (Yes at step S207), the disclosed information recorded in the disclosed region and the code-issue number recorded in the non-disclosed region are acquired (step S209). Then, in association with the code-issue number acquired through decoding, the database of the storage unit 32 is renewed by adding the reception time information (step S211).

Subsequently, an authenticity determination processing is performed at step S212. In the authenticity determination processing, it is determined whether or not the disclosed information and the code-issue number both acquired through the decoding process satisfy the predetermined relationship. It should be noted that the processing at step S212 can correspond to an example of the processing as the determining means.

If the acquired disclosed information and code-issue number satisfy the predetermined relationship and thus are determined to constitute an authentic information code, control proceeds to step S213a where an authenticity determination result transmission processing is performed. Specifically, at step S213a, data showing the image of the information code as being an authentic information code is transmitted, as authenticity determination results, by the communication network section 33 to the information processing terminal 20 via the network N.

On the other hand, if the acquired disclosed information and code-issue number do not satisfy the predetermined relationship and thus are determined not to constitute an authentic information code, control again proceeds to step S213a. Specifically, at step S213a, data showing the image of the information code as not being an authentic information code is transmitted, as authenticity determination results, by the communication network section 33 to the information processing terminal 20 via the network N.

In the information processing terminal 20, the cell information based on an image of the information code is transmitted to the server 30 to thereby receive the authenticity determination results in response (step S113). If the received authenticity determination results show that the imaged information code is an authentic information code, the display unit 25 displays and notifies the user accordingly (step S115).

For example, in the case where the disclosed information is a target URL, which is also used as data for authenticity determination, the decoded disclosed information is transmitted, together with the authenticity determination results, to the information processing terminal 20. Then, in the information processing terminal 20, the target URL can be displayed on the display unit 25 together with a notification that the target URL is an authentic URL.

On the other hand, if the received authenticity determination results show that the imaged information code is not an authentic information code, the display unit 25 displays a notification that the imaged information code is not an authentic information code (step S115). For example, in the case where the disclosed information is a target URL, which is also used for authenticity determination, the decoded disclosed information is transmitted to the information processing terminal 20 together with authenticity determination results. Then, in the information processing terminal 20, the target URL is displayed on the display unit 25 together with a notification that the target URL is not an authentic URL.

As described above, in the information code reading system 10 of the present embodiment, the information code imaged by the imaging unit 22 is subjected to authenticity determination processing on the basis of the results of the decoding processing (step S209) to determine whether the information code is authentic (step S212). Then, the information associated with the authenticity determination results of the authenticity determination processing is transmitted to the information processing terminal 20 by the communication unit 33 via the network N (step S213a).

In the authenticity determination processing described above, the disclosed information and the code-issue number both acquired through the decoding process are compared with the predetermined information stored in advance in the database of the storage unit 32. As a result of the comparison, the information code imaged by the imaging unit 22 can be easily determined as to whether or not the information code is an authentic one. Thus, the server 30 can perform authenticity determination processing for the cell information received from the information processing terminal 20, and can transmit information or data associated with authenticity determination results to the information processing terminal 20. Thus, the information processing terminal 20 is able to easily acquire information for determining whether or not the read information code or the article or the like to which the information code has been attached is an authentic one.

In the authenticity determination processing described above, the disclosed information and the code-issue number both acquired through the decoding processing are compared with the predetermined information stored in advance in the database of the storage unit 32. However, authenticity determination should not be limited to this. For example, a combination of the disclosed information (the first information) and the code-issue number (the second information) may be compared with the predetermined information in the database. Then, the results of the comparison may be used for authenticity determination. Further, the information code C may include a disclosed region in which identification information is stored. In this case, the identification information may be compared with the predetermined information stored in advance in the database of the storage unit 32 and the results of the comparison may be used for authenticity determination.

The information associated with the disclosed information transmitted from the server 30 to the information processing terminal 20 does not have to be necessarily the authenticity determination results. As a modification of the present embodiment, the information transmitted from the server 30 to the information processing terminal 20 may be different from the disclosed information (the first information) but may be data linked to the disclosed information.

In the present embodiment and in a modification thereof, it may be so configured that image data, which shows an image of the information code C, is transmitted from the information processing terminal 20 to the server 30, as in the second embodiment.

Other Embodiments

The present invention should not be construed as being limited to the foregoing embodiments, but may be implemented as follows, for example.

(1) In the foregoing embodiments, a target URL is recorded as disclosed information in the disclosed region of the information code C. However, there is no limitation in the disclosed information. For example, the disclosed information (the first information) to be recorded may be a command for displaying an image file acquired from a given website, or a command for reproducing a music file or a video file. In this case, in the decoded information transmission processing in the external decoding process performed by the server 30, other information, such as the above command, that can be disclosed is transmitted to the information processing terminal 20. Further, in the reading process performed by the information processing terminal 20 in this case, a processing based on the received information is performed in the processing at step S113, instead of performing the displaying processing at step S115. It should be noted that the processing based on the received information performed in the processing at step S113 can correspond to an example of the processing as the information processing means.

(2) In the database of the server 30, reception time information is sequentially added and stored as information indicating that the information code C where the code-issue number is recorded has been read. However, the information stored in the database is not limited to the reception time information, but other information may further be stored. For example, in capturing an image of an information code by the information processing terminal 20, position information in the form of a GPS signal, for example, may be received from a GPS satellite for transmission to the server 30 together with the reception time information to store the position information in the database together with the reception time information. In this case, one can comprehend usage status including not only the utilization frequency and utilization hours of the information code C, but also the utilization site. Thus, more detailed usage status of an information code can be easily comprehended.

(3) The code-issue number may be differently set for each area where the information code C is distributed. Thus, usage status can be comprehended on an area basis, in addition to the usage status related to utilization frequency and utilization hours. Further, the code-issue number may be differently set for each type of object to which the information code C is attached. In this case as well, usage status can be comprehended on an object-type basis, in addition to the usage status related to utilization frequency and utilization hours. In this way, more detailed usage status of an information code can be easily comprehended.

(4) In the foregoing embodiments, the information processing terminal 20 is configured by installing a given application program into a mobile terminal, such as a smartphone, having a camera function. However, the way of configuring the information processing terminal 20 is not limited to this. For example, the information processing terminal 20 may be configured as a dedicated information code reader for decoding information codes. Further, the information processing terminal 20 does not necessarily have to be configured as a mobile type terminal, but may be configured as a stationary type terminal, for example.

(5) The information code to be read in the present invention is configured as a QR code (registered trademark) in which two types of cells, i.e. light color cells and dark color cells, are arrayed. However, the configuration of the information code to be read is not limited to this. For example, the information code may be a data matrix code, a MaxiCode, or other two-dimensional codes where two types of cells, i.e. light color cells and dark color cells, are arrayed. Alternatively, the information code may be a one-dimensional code, such as a barcode.

(6) The information code to be read in the present invention may be a color code where there is an array of a plurality of types of cells having different colors, densities or luminances. For example, an object to be read in the present invention may be a color code configured by cells of eight colors which are black cells, white cells, red cells, green cells, blue cells, cyan cells, magenta cells, and yellow cells. In this case, cell display colors are correlated to numerical values. For example, a first color white is correlated to a data value 0, a second color red to a data value 1, a third color green to a data value 2, a fourth color blue to a data value 3, a fifth color magenta to a data value 4, a sixth color yellow to a data value 5, a seventh color cyan to a data value 6, and an eighth color black to a data value 7.

When cell display colors are correlated to numerical values in this way, the cell information of the first and third embodiments described above is produced as multivalued data such as four-value or eight-value data, instead of the binarized data, and transmitted to the server 30. Using such a color code as well, when the cell information (the first and third embodiments) or the image data (the second embodiment) is transmitted to the server 30, the usage status of the information code can be easily comprehended without giving a sense of distrust to the user.

(7) As described above, the server 30 is capable of administrating information linked to the code-issue number (the second information) among the results of the external decoding process. Thus, the server 30 can transmit not only the disclosed information (the first information) or data associated with the disclosed information, but also data linked to the code-issue number (the second information), to the information processing terminal 20. Thus, the user can enjoy services also using the information linked to the code-issue number (the second information). Also, the server 30 can transmit the information linked to the code-issue number (the second information), instead of the disclosed information (the first information) or information associated with the disclosed information, to the information processing terminal 20. In this case, the user can enjoy services using the information linked to the code-issue number (the second information).

The embodiments set forth above are only examples and should not be construed as limiting the scope of the invention. These embodiments and variations may be implemented in various other modes with omissions, replacements or modifications within a scope not departing from the spirit of the invention. These embodiments and their modifications should be construed as being encompassed by the scope or spirit of the invention and as being encompassed by the invention recited in the claims and the equivalent scope.

What is claimed is:

1. A system which reads an information code, comprising:
   an information processing terminal; and
   a server communicably connected to the information processing terminal,
   wherein the information processing terminal comprises
      imaging means for imaging an information code configured by a plurality of types of cells, the cells being arrayed to form a contour, first and second information being recorded in advance by partial cells among the cells arrayed within the contour, the first information being different from the second information,
      producing means for reading, from the imaged information code, cell information indicating the information code and including the first and second information,
      terminal-side transmitting means for transmitting, to the server, the cell information indicating the information code obtained by the imaging means, and
      information processing means for performing a process with the first information received from the server in reply to transmission of the cell information indicating the information code from the terminal-side transmitting means; and
   the server comprises
      decoding means for decoding the cell information indicating the information code received from the information processing terminal,
      storage means for storing therein other information of the information code, the other information showing that the information code has become an object being read by the information processing terminal, when the second information of the information code has been decoded by the decoding means, and
      server-side transmitting means for transmitting, to the information processing terminal, either the first information decoded by the decoding means or information related to the first information.

2. The system of claim 1, wherein
   the plurality of types of cells are different, at least, in colors, densities or luminances from each other, and
   the cell information indicating the information code includes information necessary for decoding the information code, the information necessary for decoding the information code being information showing digitization of the cells according to the colors, densities or luminances.

3. The system of claim 2, wherein
   the server comprises determination means for determining, based on a decoding performed by the decoding means, whether or not the information code is an authentic information code imaged by the imaging means, and
   the server-side transmitting means is configured to transmit, to the information processing terminal, information indicating a determination of the determination means.

4. The system of claim 3, wherein the information processing terminal is capable of being communicably connected to the server via a network.

5. The system of claim 1, wherein
   the server comprises determination means for determining, based on a decoding performed by the decoding means, whether or not the information code is an authentic information code imaged by the imaging means, and the server-side transmitting means is configured to transmit, to the information processing terminal, information indicating a determination of the determination means.

6. The system of claim 1, wherein the server is configured to manage information linked to the second information, the information linked to the second information being among results of a decoding of the decoding means, and the server-side transmitting means is configured to transmit, to the information processing terminal, the information linked to the second information in reply to the decoding of the decoding means.

7. The system of claim 1, wherein the information processing terminal is capable of being communicably connected to the server via a network.

8. The system of claim 1, wherein the first information is different from the second information in that the first information is information disclosed to public and the second information is information non-disclosed to public.

9. The system of claim 8, wherein the information code is a partially non-disclosed code that includes a non-disclosed region and a disclosed region, the first information being recorded in the disclosed region, the second information being recorded in the non-disclosed region and encrypted according to an encryption key, and the storage means is configured to store therein the encryption key such that the decoding means decodes the second information based on the encryption key.

10. The system of claim 9, wherein the plurality of types of cells which are different, at least, in colors, densities or luminances from each other, and the cell information indicating the information code includes information necessary for decoding the information code, the information necessary for decoding the information code being information showing digitization of the cells according to the colors, densities or luminances.

11. The system of claim 10, wherein the server comprises determination means for determining, based on a decoding performed by the decoding means, whether or not the information code is an authentic information code imaged by the imaging means, and the server-side transmitting means is configured to transmit, to the information processing terminal, information indicating a determination of the determination means.

12. The system of claim 10, wherein the server is configured to manage information linked to the second information, the information linked to the second information being among results of a decoding of the decoding means, and the server-side transmitting means is configured to transmit, to the information processing terminal, the information linked to the second information in reply to the decoding of the decoding means.

13. The system of claim 12, wherein the information processing terminal is capable of being communicably connected to the server via a network.

14. The system of claim 10, wherein the server is configured to manage information linked to the second information, the information linked to the second information being among results of a decoding of the decoding means, and the server-side transmitting means is configured to transmit, to the information processing terminal, the information linked to the second information in reply to the decoding of the decoding means.

15. The system of claim 14, wherein the information processing terminal is capable of being communicably connected to the server via a network.

16. A system which reads an information code, comprising:

an information processing terminal; and a server communicably connected to the information processing terminal, wherein the information processing terminal comprises an imaging unit imaging an information code configured by a plurality of types of cells, the cells being arrayed to form a contour, first and second information being recorded in advance by partial cells among the cells arrayed within the contour, the first information being different from the second information, a producing unit reading, from the imaged information code, cell information indicating the information code and including the first and second information;

a terminal-side transmitting unit transmitting, to the server, cell information indicating the information code obtained by the imaging unit, and an information processing unit performing a process with the first information received from the server in reply to transmission of the cell information indicating the information code from the terminal-side transmitting unit; and the server comprises a decoding unit decoding the cell information indicating the information code received from the information processing terminal, a storage storing therein other information of the information code, the other information showing that the information code has become an object being read by the information processing terminal, when the second information of the information code has been decoded by the decoding unit, and a server-side transmitting unit transmitting, to the information processing terminal, either the first information decoded by the decoding unit or information related to the first information.

17. The system of claim 16, wherein the first information is different from the second information in that the first information is information disclosed to public and the second information is information non-disclosed to public.

18. The method of claim 17, wherein the information code is a partially non-disclosed code that includes a non-disclosed region and a disclosed region, the first information being recorded in the disclosed region, the second information being recorded in the non-disclosed region and encrypted according to an encryption key stored in the server.

19. The method of claim 18, wherein the encryption key is stored in the server in advance.

20. A method which reads an information code in a system comprising an information processing terminal and a server communicably connected to the information processing terminal, the information code being configured by a plurality of types of cells, the cells being arrayed to form a contour, the method comprising steps of:

first allowing the information processing terminal to (i) image the information code in which first and second information is recorded in advance by partial cells among the cells arrayed within the contour, the first information being different in type from the second information, (ii) produce, from the imaged information code, cell information indicating the information code, and (iii) transmit, to the server, the cell information indicating the information code imaged and including the first and second information;

second allowing the sever to (i) decode the cell information indicating the information code received from the information processing terminal; (ii) store therein other information of the information code, the other information showing that the information code has become an object being read by the information processing terminal, when the second information of the information code has been decoded; and (iii) transmit, to the information processing terminal, either the first information decoded by the decoding or information related to the first information; and third allowing the information processing terminal to perform a process with the first information received from the server in reply to transmission of the information indicating the information code to the sever.

21. The method of claim 20, wherein the information code has an array of a plurality of types of cells which are different, at least, in colors, densities or luminances from each other, and the cell information indicating the information code includes information necessary for decoding the information code, the information necessary for decoding the information code being information showing digitization of the cells according to the colors, densities or luminances.

22. The method of claim 20, wherein the first information is different from the second information in that the first information is information disclosed to public and the second information is information non-disclosed to public.

* * * * *